United States Patent
Hiyama

(10) Patent No.: US 8,006,655 B2
(45) Date of Patent: Aug. 30, 2011

(54) HEAT STORAGE SYSTEM FOR VEHICLE

(75) Inventor: Jinichi Hiyama, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 371 days.

(21) Appl. No.: 12/310,536

(22) PCT Filed: Nov. 27, 2007

(86) PCT No.: PCT/JP2007/072806

§ 371 (c)(1),
(2), (4) Date: Feb. 27, 2009

(87) PCT Pub. No.: WO2008/066014

PCT Pub. Date: Jun. 5, 2008

(65) Prior Publication Data

US 2010/0186685 A1    Jul. 29, 2010

(30) Foreign Application Priority Data

Nov. 28, 2006   (JP) .................................. 2006-319481

(51) Int. Cl.
*F01P 11/02* (2006.01)

(52) U.S. Cl. ................. 123/41.14; 123/41.08; 123/41.44

(58) Field of Classification Search ................. 123/41.14
See application file for complete search history.

(56) References Cited

U.S. PATENT DOCUMENTS

| | | | |
|---|---|---|---|
| 2002/0011221 A1* | 1/2002 | Suzuki et al. | 123/41.14 |
| 2002/0035972 A1 | 3/2002 | Suzuki et al. | |
| 2002/0040693 A1* | 4/2002 | Toyoshima et al. | 123/41.14 |
| 2002/0195068 A1* | 12/2002 | Ichinose et al. | 123/41.14 |
| 2003/0131806 A1* | 7/2003 | Suzuki et al. | 123/41.14 |
| 2009/0205590 A1* | 8/2009 | Vetrovec | 123/41.14 |

FOREIGN PATENT DOCUMENTS

| | | |
|---|---|---|
| EP | 1 167 713 | 1/2002 |
| JP | 11-182307 | 7/1999 |
| JP | 2002-021560 | 1/2002 |
| JP | 2002-087075 | 3/2002 |
| JP | 2004-316524 | 11/2004 |

OTHER PUBLICATIONS

International Search Report issued Dec. 25, 2007 in the International (PCT) Application of which the present application is the U.S. National Stage.

* cited by examiner

*Primary Examiner* — Michael Cuff
*Assistant Examiner* — James Kim
(74) *Attorney, Agent, or Firm* — Wenderoth, Lind & Ponack, L.L.P.

(57) ABSTRACT

In a heat storage system for a vehicle including a heat accumulator 3, in which engine coolant is stored and allowed to flow, in an engine coolant circulation circuit connecting an engine 1 and a heater core 2 of an air conditioning unit, the engine coolant circulation circuit is a circuit connecting heat accumulator 3 side inlet and outlet, engine 1 side inlet and outlet, and heater core 2 side inlet and outlet, and has a circuit configuration including four modes of a "heat storage mode," a "heat storage maintaining mode," a "quick engine warm-up mode," and a "quick interior warm-up mode" to be selectable by switching a valve set in the circuit.

8 Claims, 12 Drawing Sheets

<HEAT STORAGE DURING DRIVING (IN STABLE REGION) (WITH HEATER IN USE)>

<WHEN ENGINE IS STOPPED (HEAT STORAGE STATE)>

<IMMEDIATELY AFTER START OF ENGINE (IN QUICK ENGINE WARM-UP)>

<IMMEDIATELY AFTER START OF ENGINE (IN QUICK INTERIOR WARM-UP)>

<IMMEDIATELY AFTER START OF ENGINE (IN QUICK ENGINE WARM-UP)>

<IMMEDIATELY AFTER START OF ENGINE>

<HEAT STORAGE DURING DRIVING (IN STABLE REGION)>

<WHEN ENGINE IS STOPPED (HEAT STORAGE STATE)>

<IMMEDIATELY AFTER START OF ENGINE (IN QUICK ENGINE WARM-UP)>

<IMMEDIATELY AFTER START OF ENGINE (IN QUICK INTERIOR WARM-UP)>

<HEAT STORAGE DURING DRIVING (IN STABLE REGION) (WITH HEATER IN USE)>

<WHEN ENGINE IS STOPPED (HEAT STORAGE STATE)>

<IMMEDIATELY AFTER START OF ENGINE (IN QUICK ENGINE WARM-UP)>

<IMMEDIATELY AFTER START OF ENGINE (IN QUICK INTERIOR WARM-UP)>

HEAT STORAGE SYSTEM FOR VEHICLE

TECHNICAL FIELD

The present invention relates to a heat storage system for a vehicle which improves a quick engine warm-up performance and a quick interior warm-up performance immediately after a start of an engine.

BACKGROUND ART

Conventionally, a heat storage system for a vehicle storing engine coolant while retaining heat has been known that includes a heat accumulator, in which the engine coolant is stored and allowed to flow, in an engine coolant circulation circuit connecting an engine and a radiator (for example, Japanese Patent Application Publication No. Hei 11-182307).

In the conventional heat storage system for a vehicle, the engine coolant which has become high in temperature during driving of the vehicle is taken into the heat accumulator, and the high-temperature engine coolant is stored while retaining heat in the heat accumulator during stopping of the vehicle. Then, at the next start of the engine, the high-temperature engine coolant in the heat accumulator is sent to the engine to be used for an early warm-up of the engine.

DISCLOSURE OF THE INVENTION

Problem to be Solved by the Invention

However, the conventional heat storage system for a vehicle has a problem that a request for an early effect of interior heating immediately after the start of the engine cannot be met, since the configuration allows only an early warm-up of the engine to be performed by sending the high-temperature engine coolant in the heat accumulator to the engine at the start of the engine.

The present invention has been made in view of the problem, and has an object of providing a heat storage system for a vehicle which can improve a quick engine warm-up performance and a quick interior warm-up performance immediately after the start of the engine by individual settings of a quick engine warm-up mode and a quick interior warm-up mode.

Means for Solving the Problem

In order to achieve the object, the present invention provides a heat storage system for a vehicle comprising a heat accumulator, in which engine coolant is stored and allowed to flow, in an engine coolant circulation circuit connecting an engine and a heater core of an air conditioning unit, the system characterized in that the engine coolant circulation circuit is a circuit connecting heat-accumulator side inlet and outlet, engine side inlet and outlet, and heater-core side inlet and outlet, and has a circuit configuration in which four modes are selectable by switching a valve set in the circuit, the four modes including: a heat storage mode in which the engine coolant circulates at least through the engine side inlet and outlet and the heat-accumulator side inlet and outlet; a heat storage maintaining mode in which the heat-accumulator side inlet and outlet are disconnected; a quick engine warm-up mode in which hot water stored in the heat accumulator circulates only through the heat-accumulator side inlet and outlet and the engine side inlet and outlet; and a quick interior warm-up mode in which the hot water stored in the heat accumulator circulates only through the heat-accumulator side inlet and outlet and the heater-core side inlet and outlet.

EFFECTS OF THE INVENTION

Thus, in the heat storage system for a vehicle of the present invention, when the heat storage mode is selected by switching the valve set in the engine coolant circulation circuit during driving, the engine coolant circulates through at least the engine side inlet and outlet and the heat-accumulator side inlet and outlet so that the high-temperature engine coolant may flow in the heat accumulator.

When the heat storage maintaining mode is selected by switching the valve set in the engine coolant circulation circuit when the engine is stopped, the heat-accumulator side inlet and outlet are disconnected so as to store the high-temperature engine coolant while retaining heat in the heat accumulator.

When the quick engine warm-up mode is selected by switching the valve set in the engine coolant circulation circuit at the start of the engine after the engine has been stopped, the hot water (high-temperature engine coolant) stored in the heat accumulator circulates only through the heat-accumulator side inlet and outlet and the engine side inlet and outlet so as to enable the early warm-up of the engine after the start of the engine.

When the quick interior warm-up mode is selected by switching the valve set in the engine coolant circulation circuit at the start of the engine after the engine has been stopped, the hot water stored in the heat accumulator circulates only through the heat-accumulator side inlet and outlet and the heater-core side inlet and outlet so as to enable interior heating immediately after the start of the engine.

Also, two modes of the quick engine warm-up mode and the quick interior warm-up mode may be selected in a short period of time at the start of the engine after the engine has been stopped by switching the valve set in the engine coolant circulation circuit.

As a result, the individual settings of the quick engine warm-up mode and the quick interior warm-up mode can improve the quick engine warm-up performance and the quick interior warm-up performance immediately after the start of the engine.

EXPLANATION OF REFERENCE NUMERALS

Figure 1:
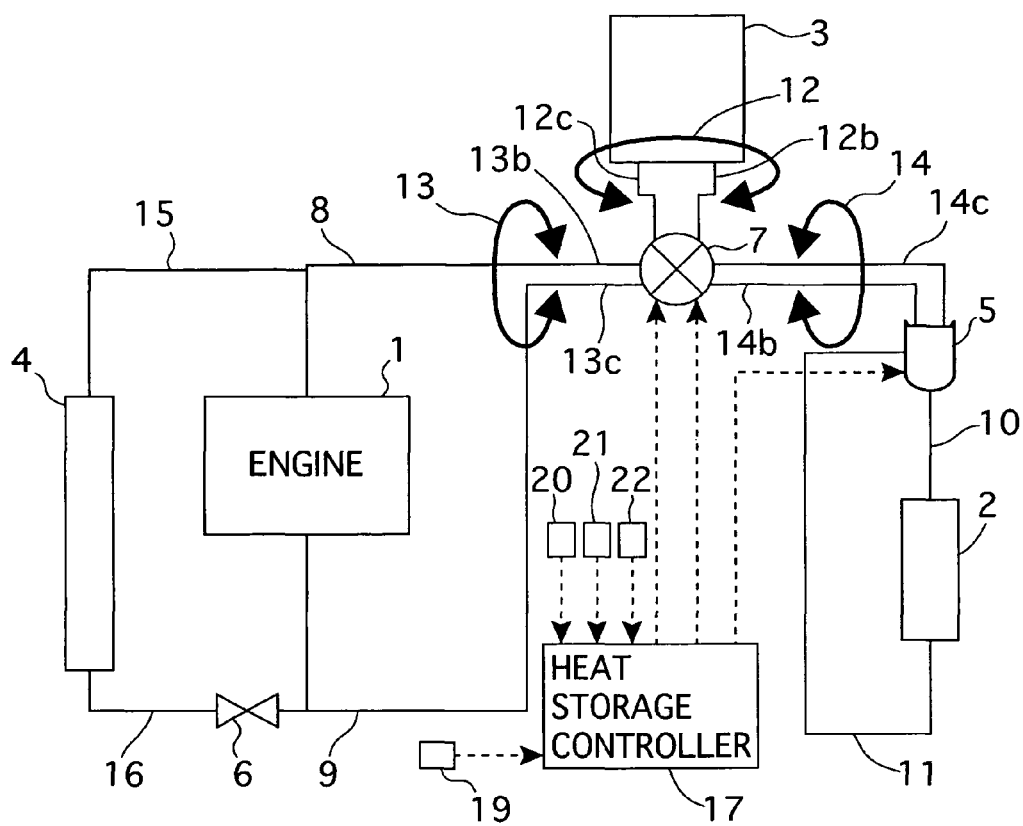
FIG. 1 is a view of an engine coolant circulation circuit which illustrates a heat storage system for a vehicle (one example of the heat storage system for a vehicle) of Embodiment 1.

1 Engine
2 Heater core
3 Heat accumulator
4 Radiator
5 Electric water pump
6 Thermostat
7 Control valve
8 Heater-core side engine outlet pipe
9 Heater-core side engine inlet pipe
10 Heater-core inlet pipe
11 Heater-core outlet pipe
12 Heat-accumulator side two-way pipe
13 Engine-side two-way pipe
14 Heater-core side two-way pipe
15 Radiator-side engine outlet pipe
16 Radiator-side engine inlet pipe
17 Heat storage controller
31 First valve
32 Second valve
33 Third valve
34 Fourth valve
35*a*, 35*b*, 35*c* Engine outlet pipe
36*a*, 36*b*, 36*c* Heat-accumulator outlet pipe
37*a*, 37*b*, 37*c*, 37*d* Heater-core outlet pipe
38 First bypass pipe
39 Second bypass pipe
40 Third bypass pipe

BEST MODES FOR CARRYING OUT THE INVENTION

Hereinafter, best modes for achieving a heat storage system for a vehicle of the present invention will be described based on Embodiment 1 and Embodiment 2 shown in the drawings.

Embodiment 1

First, a system configuration will be described.

Figure 2:
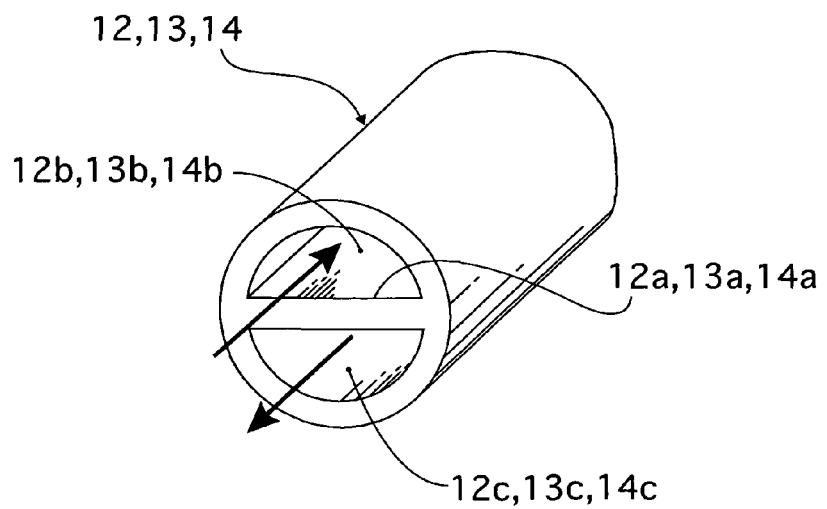
FIG. 2 is a perspective view showing a two-way pipe employed in the heat storage system for a vehicle of Embodiment 1.
Figure 3:
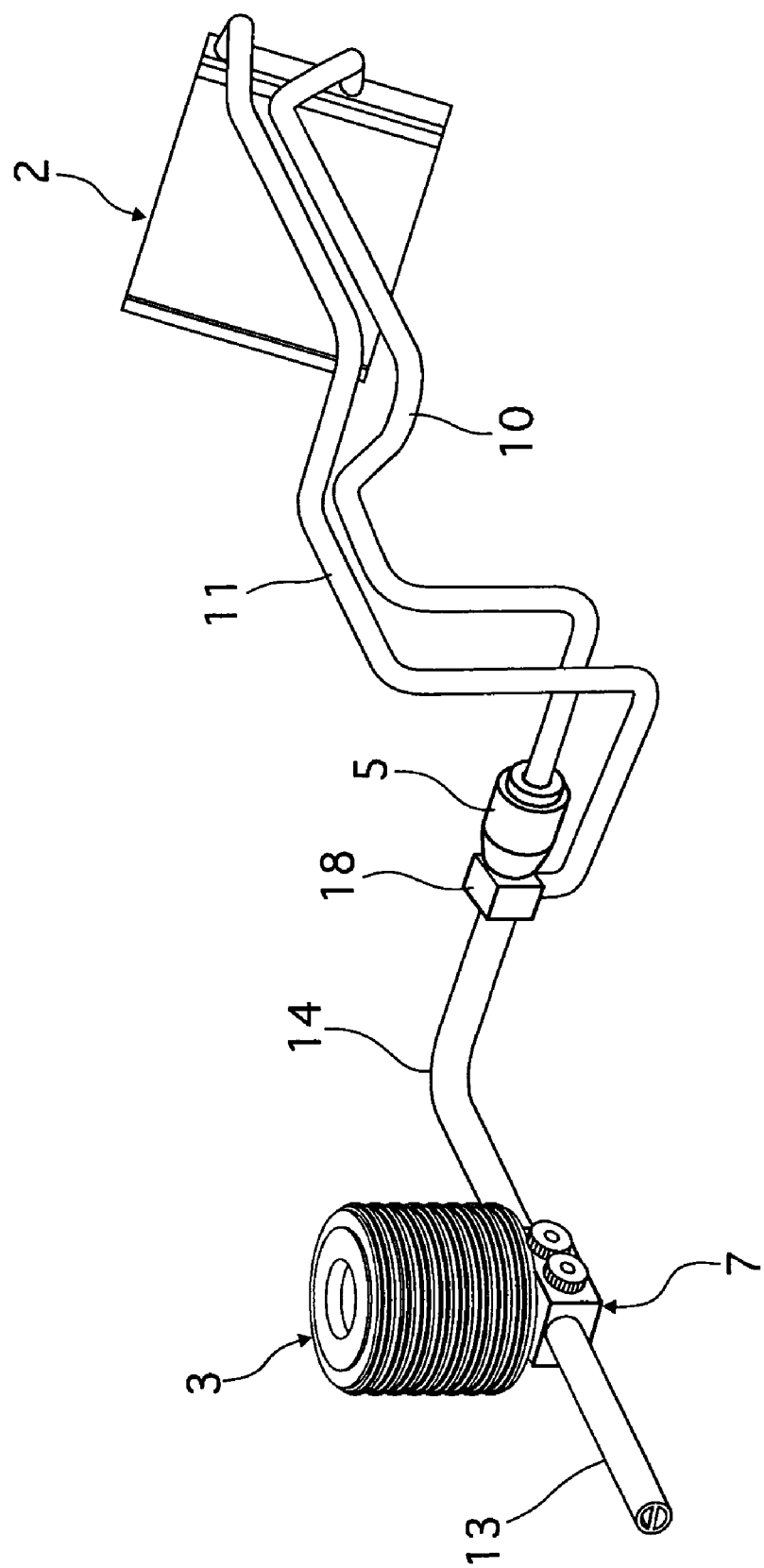
FIG. 3 is a perspective view showing the engine coolant circulation circuit connecting a heat accumulator and a heater core in the heat storage system for a vehicle of Embodiment 1.
Figure 4:
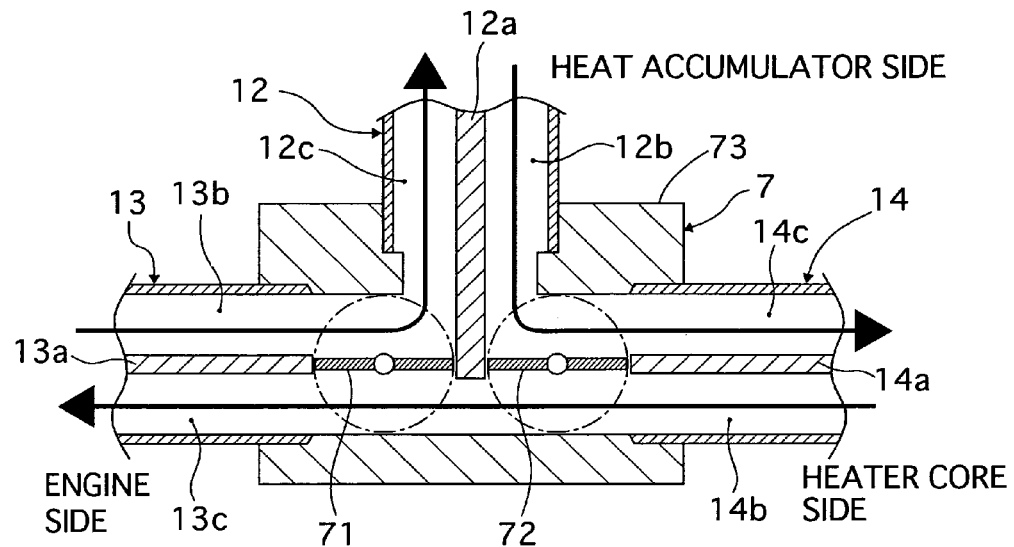
FIG. 4 is a sectional view showing positions of valve bodies of a control valve when a heat storage mode is selected in the heat storage system for a vehicle of Embodiment 1.
Figure 5:
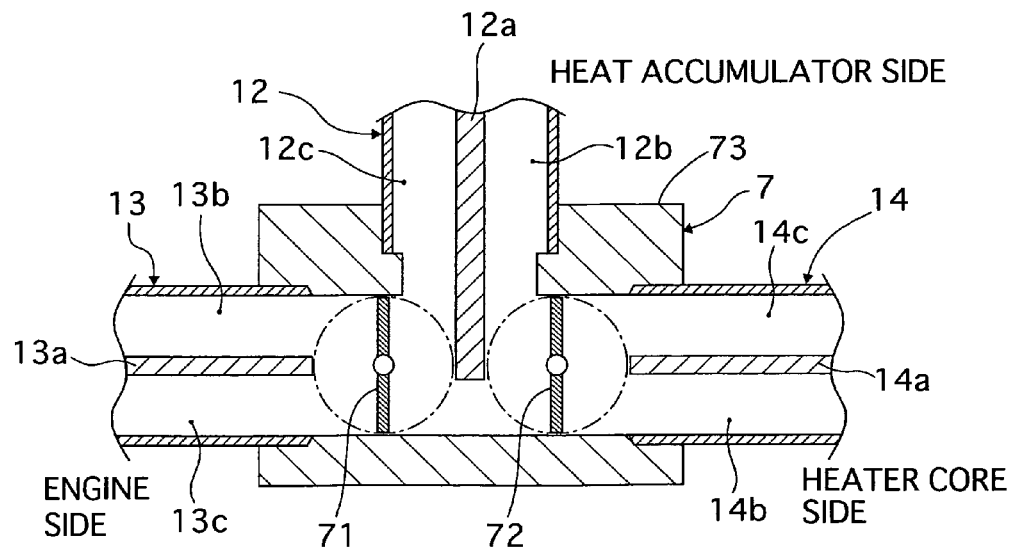
FIG. 5 is a sectional view showing positions of the valve bodies of the control valve when a heat storage maintaining mode is selected in the heat storage system for a vehicle of Embodiment 1.
Figure 6:
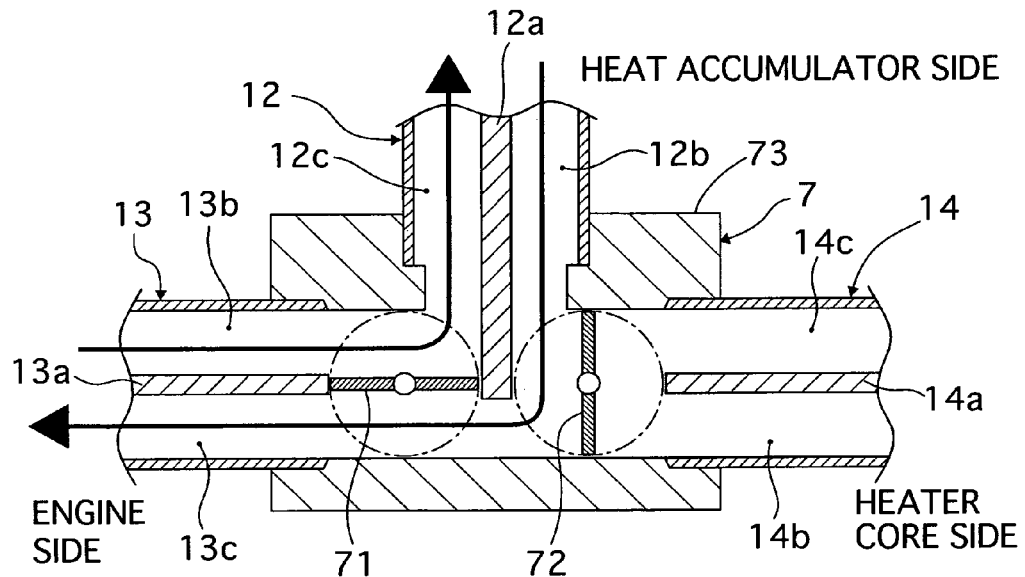
FIG. 6 is a sectional view showing positions of the valve bodies of the control valve when a quick engine warm-up mode is selected in the heat storage system for a vehicle of Embodiment 1.
Figure 7:
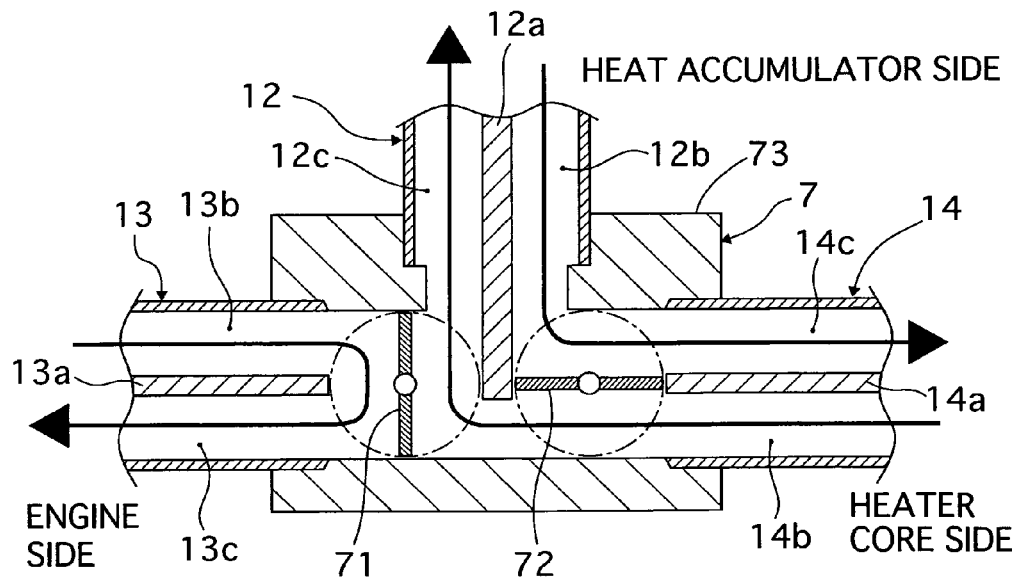
FIG. 7 is a sectional view showing positions of the valve bodies of the control valve when a quick interior warm-up mode is selected in the heat storage system for a vehicle of Embodiment 1.

FIG. 1 is a view of an engine coolant circulation circuit which illustrates a heat storage system for a vehicle (one example of a heat storage system for a vehicle) of Embodiment 1. FIG. 2 is a perspective view showing a two-way pipe employed in the heat storage system for a vehicle of Embodiment 1. FIG. 3 is a perspective view showing the engine coolant circulation circuit connecting a heat accumulator and a heater core in the heat storage system for a vehicle of Embodiment 1. FIG. 4 is a sectional view showing positions of valve bodies of a control valve when a heat storage mode is selected in the heat storage system for a vehicle of Embodiment 1. FIG. 5 is a sectional view showing positions of the valve bodies of the control valve when a heat storage maintaining mode is selected in the heat storage system for a vehicle of Embodiment 1. FIG. 6 is a sectional view showing positions of the valve bodies of the control valve when a quick engine warm-up mode is selected in the heat storage system for a vehicle of Embodiment 1. FIG. 7 is a sectional view showing positions of the valve bodies of the control valve when a quick interior warm-up mode is selected in the heat storage system for a vehicle of Embodiment 1.

The heat storage system for a vehicle of Embodiment 1 includes, as shown in FIG. 1, an engine 1, a heater core 2, a heat accumulator 3, a radiator 4, an electric water pump 5, a thermostat 6, a control valve 7, a heater-core side engine outlet pipe 8, a heater-core side engine inlet pipe 9, a heater-core inlet pipe 10, a heater-core outlet pipe 11, a heat-accumulator side two-way pipe 12, an engine-side two-way pipe 13, a heater-core side two-way pipe 14, a radiator-side engine outlet pipe 15, a radiator-side engine inlet pipe 16, and a heat storage controller 17.

The heat storage system for a vehicle of Embodiment 1 includes the heat accumulator 3, in which engine coolant is stored and allowed to flow, in the engine coolant circulation circuit connecting the engine 1 and the heater core 2 of an air conditioning unit not shown in the drawing.

The heat accumulator 3 has, for example, a structure in which the outer circumference of a hot water storage layer is encompassed by a vacuum heat insulation layer, a structure in which the outer circumference of a hot water storage layer is encompassed by a latent heat storage material layer (e.g., an enclosure layer of a paraffin-enclosed capsule formed into a microcapsule) and a vacuum heat insulation layer in order to improve heat storage efficiency, a structure in which the outer circumference of a hot water storage layer is encompassed by a heat medium layer (e.g., a transmission oil layer) and a vacuum heat insulation layer, or the like. Further, the structure of a container thereof may be a multi-container type heat accumulator structure in which multiple cylindrical containers are combined coaxially or may be a stacked type heat accumulator structure in which a number of heat accumulator components are stacked.

The engine coolant circulation circuit is a circuit connecting heat accumulator 3 side inlet and outlet, engine 1 side inlet and outlet, and heater core 2 side inlet and outlet, and has a circuit configuration including four modes of a "heat storage mode," a "heat storage maintaining mode," a "quick engine warm-up mode," and a "quick interior warm-up mode" to be selectable by switching the control valve 7 set in the circuit.

In the "heat storage mode," the engine coolant circulates through the engine 1 side inlet and outlet, the heat accumulator 3 side inlet and outlet, and the heater core 2 side inlet and outlet. In the "heat storage maintaining mode," the heat accumulator 3 side inlet and outlet are disconnected. In the "quick engine warm-up mode," hot water stored in the heat accumulator 3 circulates only through the heat accumulator 3 side inlet and outlet and the engine 1 side inlet and outlet. In the "quick interior warm-up mode," the hot water stored in the heat accumulator 3 circulates only through the heat accumulator 3 side inlet and outlet and the heater core 2 side inlet and outlet.

As shown in FIG. 1, the engine coolant circulation circuit connects the heat-accumulator side two-way pipe 12, the engine-side two-way pipe 13, and the heater-core side two-way pipe 14 to the heat accumulator 3 side inlet and outlet, the engine 1 side inlet and outlet, and the heater core 2 side inlet and outlet, respectively, the, pipes integrally including respective outward paths from outlets and return paths to inlets. As shown in FIG. 2, the respective two-way pipes 12, 13, and 14 are provided with partition walls 12a, 13a, and 14a in diameter positions of cylindrical pipes, so that, of their respective two half-cylindrical spaces, one is defined as an outward path 12b, 13b, or 14b from the outlet, and the other is defined as a return path 12c, 13c, or 14c to the inlet.

As shown in FIGS. 4 to 7, the engine-side two-way pipe 13 and the heater-core side two-way pipe 14 are arranged on the same pipe axis, and the heat-accumulator side two-way pipe 12 is arranged so as to intersect perpendicularly with the pipe axis. Thus, the two-way pipes 12, 13, and 14 are connected with one another at a portion where the heat-accumulator side two-way pipe 12 intersects.

As shown in FIGS. 4 to 7, by way of an extension of the partition wall 12a, the heat-accumulator side two-way pipe 12 disconnects the engine 1 side outlet (the outward path 13b) and the heater core 2 side inlet (the return path 14c), as well as connects the engine 1 side inlet (the return path 13c) and the heater core 2 side outlet (the outward path 14b). In a connecting portion of the engine 1 side inlet and outlet (the outward path 13b and the return path 13c) and the heat accumulator 3 side inlet (the return path 12c), an engine side valve 71 is arranged which switches between an opened position for connecting the engine 1 side outlet and the heat accumulator 3 side inlet and a closed position for disconnecting the engine 1 side inlet and outlet and the heat accumulator 3 side inlet. In a connecting portion of the heater core 2 side inlet and outlet (the outward path 14b and the return path 14c) and the heat accumulator 3 side outlet (the outward path 12b), a heater side valve 72 is arranged which switches between an opened position for connecting the heater core 2 side inlet and the heat accumulator 3 side outlet and a closed position for disconnecting the heater core 2 side inlet and outlet and the heat accumulator 3 side outlet As shown in FIGS. 4 to 7, the engine side valve 71 and the heater side valve 72 are valve components of the control valve 7 which are collectively set while a first connector 73 (connector member) serving as a common valve body, the first connector 73 connecting the heat-accumulator side two-way pipe 12, the engine-side two-way pipe 13, and the heater-core side two-way pipe 14. Note that opening/closing operations of the engine side valve 71 and the heater side valve 72 are performed by individual valve actuators.

As shown in FIG. 3, the electric water pump 5 is set at a connecting portion of the heater-core inlet pipe 10 and a second connector 18 connecting the heater-core side two-way pipe 14, the heater-core inlet pipe 10, and the heater-core outlet pipe 11.

The heat storage controller 17 receives information from an air-conditioner switch 19, an ignition switch 20, an external temperature sensor 21, an engine coolant temperature sensor 22, and the like, and performs selection control of the "heat storage mode," the "heat storage maintaining mode," the "quick engine warm-up mode," or the "quick interior warm-up mode" by a control instruction with respect to the valve actuator of the engine side valve 71, the valve actuator of the heater side valve 72, or a motor of the electric water pump 5.

In the "heat storage mode," as shown in FIG. 4, the engine side valve 71 and the heater side valve 72 are both set in the opened positions during driving with a heater in use.

In the "heat storage maintaining mode," as shown in FIG. 5, the engine side valve 71 and the heater side valve 72 are both set in the closed positions when the engine is stopped.

In the "quick engine warm-up mode," as shown in FIG. 6, the engine side valve 71 is set in the opened position and the heater side valve 72 is set in the closed position immediately after the start of the engine.

In the "quick interior warm-up mode," as shown in FIG. 7, the engine side valve 71 is set in the closed position, the heater side valve 72 is set in the opened position, and the electric water pump 5 is set on a pump operation side immediately after the start of the engine.

Figure 8:
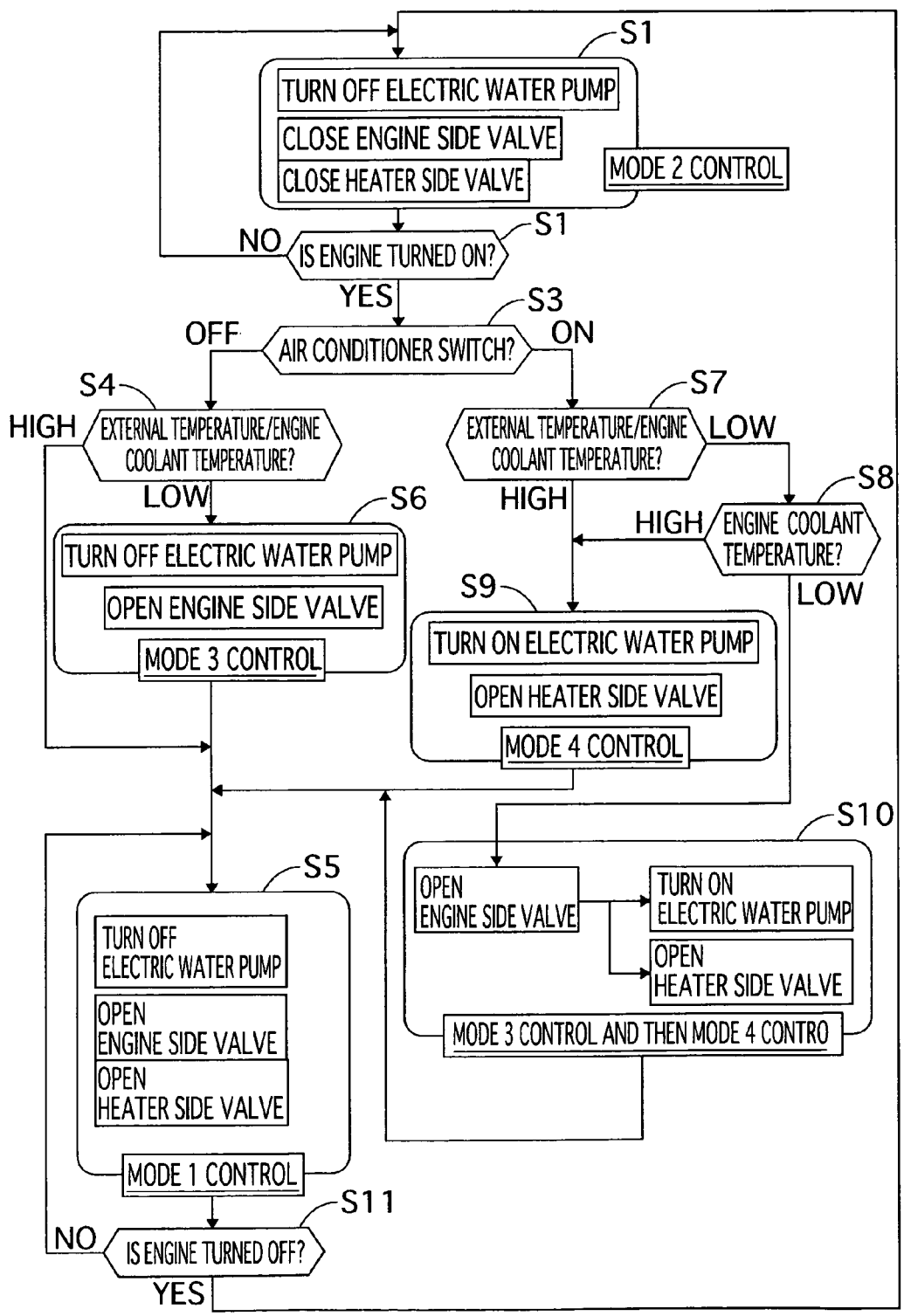
FIG. 8 is a flowchart showing the flow of a mode selection control process to be executed by a heat storage controller 17 of Embodiment 1.

FIG. 8 is a flowchart showing the flow of a mode selection control process to be executed by the heat storage controller 17 of Embodiment 1, and each step (of mode selection control device) will be described below. Note that, in the flowchart, a selection control of the "heat storage mode" is called a mode 1 control, a selection control of the "heat storage maintaining mode" is called a mode 2 control, a selection control of the "quick engine warm-up mode" is called a mode 3 control, and a selection control of the "quick interior warm-up mode" is called a mode 4 control.

Step S1 is a step of executing the mode 2 control in which the electric water pump 5 is turned off, the engine side valve 71 is closed, and the heater side valve 72 is closed, following an engine stop judgment in step S2 or step S11.

Step S2 is a step of judging whether or not the engine is started, following the mode 2 control in step S1. The process proceeds to step S3 when the judgment is YES, and the process returns to step S1 when the judgment is NO.

Step S3 is a step of judging whether the air-conditioner switch 19 is turned off or on, following the engine start judgment in step S2. The process proceeds to step S4 when the air-conditioner switch 19 is turned off, and the process proceeds to step S7 when the air-conditioner switch 19 is turned on.

Step S4 is a step of judging whether or not the external temperature and the engine coolant temperature are both high, following the judgment that the air-conditioner switch 19 is turned off in step S3. The process proceeds to step S5 when the external temperature and the engine coolant temperature are both high, and the process proceeds to step S6 when at least one of the external temperature and the engine coolant temperature is low.

Step S5 is a step of executing the mode 1 control in which the electric water pump 5 is turned off, the engine side valve 71 is opened, and the heater side valve 72 is opened, following the judgment that the external temperature and the engine coolant temperature are both high in step S4. Note that the process proceeds to step S5 to execute the mode 1 control after executing the mode 3 control in step S6, the mode 4 control in step S8, or the mode 3 control and then the mode 4 control in step S10 for a predetermined period of time. Moreover, the execution of the mode 1 control continues while it is judged that the engine is in operation in step S11.

Step S6 is a step of executing the mode 3 control in which the electric water pump 5 is turned off, the engine side valve 71 is opened, and the heater side valve 72 is closed, following the judgment that at least one of the external temperature and the engine coolant temperature is low in step S4. The mode 3 control is executed for a predetermined period of time or for a period of time depending on stored amount of heat or the like of the heat accumulator 3.

Step S7 is a step of judging whether or not the external temperature and the engine coolant temperature are both high, following the judgment that the air-conditioner switch 19 is turned on in step S3. The process proceeds to step S8 when the external temperature and the engine coolant temperature are both high and there is an operation request for cooling, and the process proceeds to step S9 when at least one of the external temperature and the engine coolant temperature is low and there is an operation request for heating.

Step S8 is a step of judging whether the engine coolant temperature is high or low, following the judgment that at least one of the external temperature and the engine coolant temperature is low in step S7. The process proceeds to step S9 when it is judged that the engine coolant temperature is high, and the process proceeds to step S10 when it is judged that the engine coolant temperature is low.

Step S9 is a step of executing the mode 4 control in which the electric water pump 5 is turned on, the engine side valve 71 is closed, and the heater side valve 72 is opened, following the judgment that the external temperature and the engine coolant temperature are both high in step S7 or the judgment that the engine coolant temperature is high in step S8. The mode 4 control is executed for a predetermined period of time or for a period of time depending on stored amount of heat or the like of the heat accumulator 3.

Step S10 is, following the judgment that the engine coolant temperature is low in step S8, a step of shifting from the mode 2 control in which the electric water pump 5 is turned off, the engine side valve 71 is closed, and the heater side valve 72 is closed to the mode 3 control by turning on the engine side valve 71, and then shifting to the mode 4 control in which the electric water pump 5 is turned on, the engine side valve 71 is closed, and the heater side valve 72 is opened. In the control of shifting from the mode 3 control to the mode 4 control, each mode is executed for a predetermined period of time or for a period of time depending on stored amount of heat or the like of the heat accumulator 3.

Step S11 is a step of judging whether or not the engine 1 is stopped, following the mode 1 control in step S5. The process returns to step S5 to continue the mode 1 control when the engine 1 is in operation, and the process proceeds to step Si to switch to the mode 2 control when the engine 1 is stopped.

Next, operations will be described.

[Quick Warm-up Operation in Conventional System]

As shown in FIGS. 9A to 9D, one possible heating system for a vehicle including a heat accumulator which stores therein engine coolant while retaining heat is a system in which an engine, a radiator, a heater core, and a heat accumulator are connected with one another in parallel, a valve is provided in a position which is on a circuit connecting the engine and the heat accumulator and through which the circuit diverges toward the heater core, and a water pump is provided in a position on a circuit circulating through the heat accumulator and the heater core.

Figure 9A:
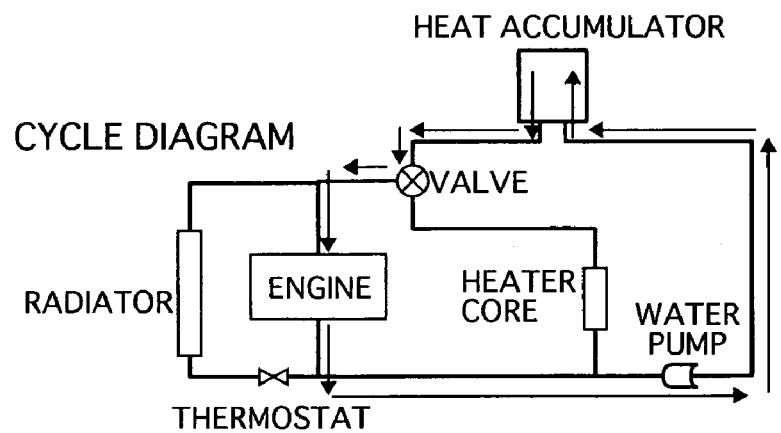
FIG. 9A is a cycle diagram illustrating a quick warm-up operation at the time of a quick engine warm-up with a conventional heating system for a vehicle using a heat accumulator.
Figure 9B:
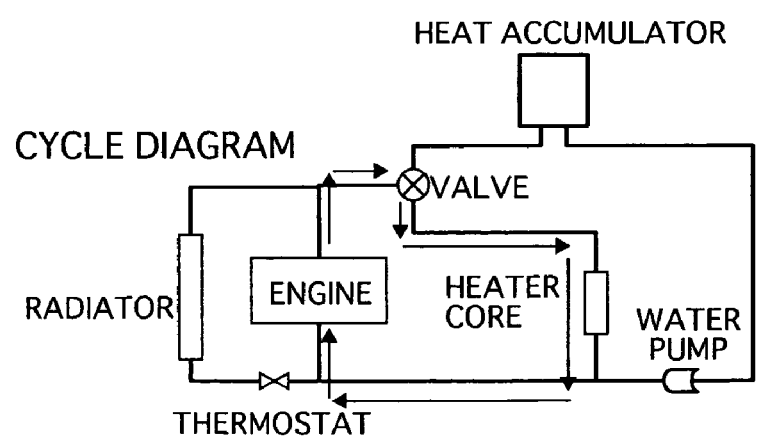
FIG. 9B is a cycle diagram illustrating a quick warm-up operation immediately after the start of an engine with the conventional heating system for a vehicle using the heat accumulator.
Figure 9C:
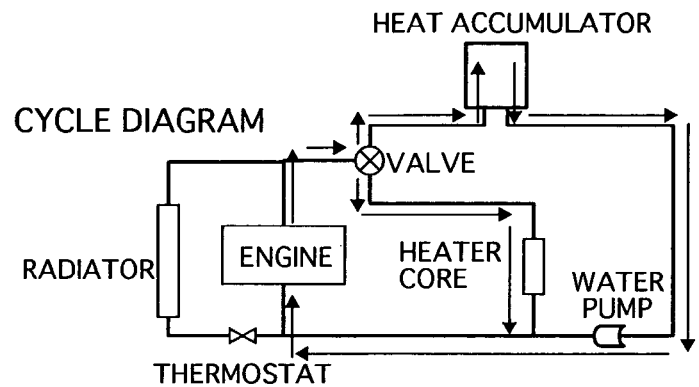
FIG. 9C is a cycle diagram illustrating a quick warm-up operation during driving with the conventional heating system for a vehicle using the heat accumulator.
Figure 9D:
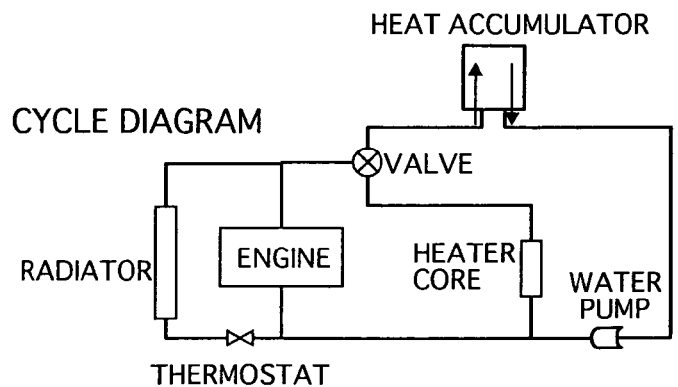
FIG. 9D is a cycle diagram illustrating a quick warm-up operation when the engine is stopped with the conventional heating system for a vehicle using the heat accumulator.

In the heating system for a vehicle, as shown in FIG. 9C, the engine coolant which has become high in temperature during driving (in a stable region) is taken into the heat accumulator. Thereafter, as shown in FIG. 9D, the heat accumulator stores therein the high-temperature engine coolant while retaining heat, when the engine is stopped. Then, at the time of the quick engine warm-up immediately after the next start of the engine, as shown in FIG. 9A, the hot water of the heat accumulator is circulated in a closed circuit of the valve, the engine, the water pump, and the heat accumulator in this order to send the high-temperature engine coolant in the heat accumulator to the engine (in a quick engine warm-up cycle) by switching the valve to a side for connecting the engine and the heat accumulator and actuating the water pump.

In the meantime, when a heating request is made immediately after the next start of the engine, as shown in FIG. 9B, the engine coolant is circulated in a closed circuit of the valve, the heater core, and the engine in this order (in an interior heating cycle) by switching the valve to a side for connecting the engine and the heater core.

As described above, the closed circuit is configured to include the heat accumulator only in the quick engine warm-up cycle immediately after the start of the engine, and the circuit does not include the heat accumulator in the interior heating cycle when the heating request is made immediately after the start of the engine. Therefore, the high-temperature engine coolant in the heat accumulator cannot be sent to the heater core immediately after the start of the engine, and thus a quick interior warm-up request for an immediate effect of interior heating cannot be met. Hereinafter, a "heat storage mode selection operation during driving with heater in use," a "heat storage mode selection operation immediately after start of engine," a "quick engine warm-up mode selection operation immediately after start of engine," a "quick interior warm-up mode selection operation immediately after start of engine," and a "mode shift operation immediately after start of engine" in the heat storage system for a vehicle of Embodiment 1 will be described.

[Heat Storage Mode Selection Operation During Driving with Heater in Use]

In the flowchart of FIG. 8, during driving (in the stable region) with the heater in use, step S5 and then step S11 are repeated, and the mode 1 control in which the electric water pump 5 is turned off, the engine side valve 71 is opened, and the heater side valve 72 is opened is executed in step S5.

Figures 10A, 10B:
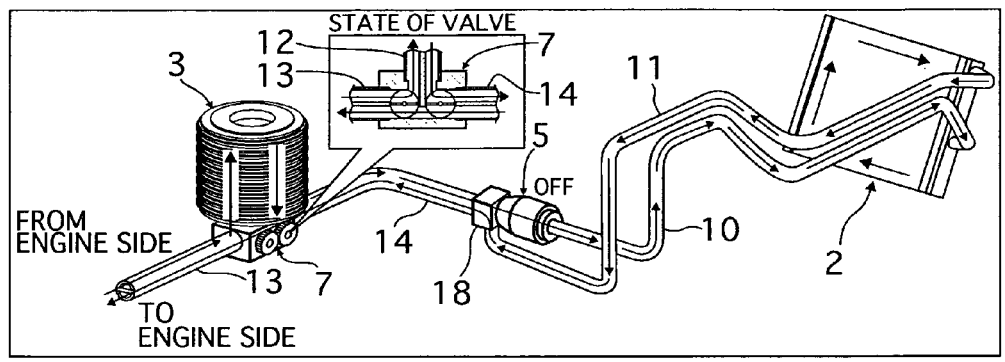
FIG. 10A is an illustrative view showing operations during driving with a heater in use in the heat storage system for a vehicle of Embodiment 1.
FIG. 10B is an illustrative view showing operations when the engine is stopped in the heat storage system for a vehicle of Embodiment 1.

When the "heat storage mode" is selected by switching the control valve 7 (FIG. 4) set in the engine coolant circulation circuit during driving with the heater in use, as shown in FIG. 10A, the engine coolant circulates through the engine 1 side inlet and outlet, the heat accumulator 3 side inlet and outlet, and the heater core 2 side inlet and outlet, so that the high-temperature engine coolant flows in the heat accumulator 3.

[Heat Storage Maintaining Mode Selection Operation]

In the flowchart of FIG. 8, when the engine 1 is stopped from the driving state in which the "heat storage mode" is selected, the process proceeds from step S11 to step S1 and step S2 in this order. The flow of proceeding from step S1 to step S2 is repeated until it is judged that the engine is turned on in step S2, and the mode 2 control in which the electric water pump 5 is turned off, the engine side valve 71 is closed, and the heater side valve 72 is closed is executed in step S1.

When the "heat storage maintaining mode" is selected by switching the control valve 7 (FIG. 5) set in the engine coolant circulation circuit while the engine is stopped, as shown in FIG. 10B, the heat accumulator 3 side inlet and outlet are disconnected so as to store the high-temperature engine coolant in the heat accumulator while retaining heat.

[Heat Storage Mode Selection Operation Immediately After Start of Engine]

In the flowchart of FIG. 8, when the air-conditioner switch 20 is turned off and the external temperature and the engine coolant temperature are high at the start of the engine 1 after the engine 1 has been stopped, the process proceeds from step S2 to step S3, step S4, step S5, and step S11 in this order. The flow of proceeding from step S5 to step S11 is repeated until it is judged that the engine is turned off in step S11, and the mode 1 control in which the electric water pump 5 is turned off, the engine side valve 71 is opened, and the heater side valve 72 is opened is executed in step S5.

That is, when the air-conditioner switch 20 is turned off and the external temperature and the engine coolant temperature are high at the start of the engine 1, it is judged that there is neither quick engine warm-up request nor quick interior warm-up request. Thus, the "heat storage mode" is immediately selected.

[Quick Engine Warm-up Mode Selection Operation Immediately After Start of Engine]

In the flowchart of FIG. 8, when the air-conditioner switch 20 is turned off and at least one of the external temperature and the engine coolant temperature is low at the start of the engine 1 after the engine 1 has been stopped, the process proceeds from step S2 to step S3, step S4, and step S6 in this order. The mode 3 control in which the electric water pump 5 is turned off, the engine side valve 71 is opened, and the heater side valve 72 is closed is executed in step S6.

Figure 10C:
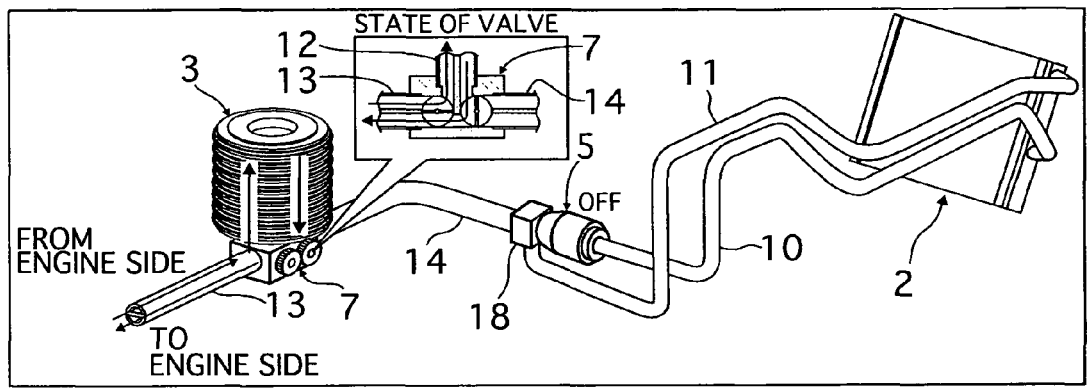
FIG. 10C is an illustrative view showing operations at the time of the quick engine warm-up immediately after the start of the engine in the heat storage system for a vehicle of Embodiment 1.

When the "quick engine warm-up mode" is selected by switching the control valve 7 (FIG. 6) set in the engine coolant circulation circuit immediately after the start of the engine, as shown in FIG. 10C, the hot water (high-temperature engine coolant) stored in the heat accumulator 3 circulates only through the heat accumulator 3 side inlet and outlet and the engine 1 side inlet and outlet, so that an early engine warm-up after the start of the engine can be performed.

Then, after a set period of time in the mode 3 control has elapsed, the process proceeds from step S6 to step S5 and step S11 in this order. The flow of proceeding from step S5 to step S11 is repeated until it is judged that the engine is turned off in step S11, and the mode 1 control in which the electric water pump 5 is turned off, the engine side valve 71 is opened, and the heater side valve 72 is opened is executed in step S5.

That is, a situation where at least one of the external temperature and the engine coolant temperature is low at the start of the engine 1 is speculated to be a situation where the external temperature is neither high nor low and the engine coolant temperature is low in light of the air-conditioner switch 20 being turned off. In this case, since the process proceeds from step S4 to step S6, the quick engine warm-up request can be met by executing the mode 3 control.

[Quick Interior Warm-up Mode Selection Operation Immediately After Start of Engine]

In the flowchart of FIG. 8, at the start of the engine 1 after the engine 1 has been stopped, when the air-conditioner switch 20 is turned on and both the external temperature and the engine coolant temperature are high, or when the air-conditioner switch 20 is turned on and the external temperature is low while the engine coolant temperature is high, the process proceeds from step S2 to step S3, step S7, and step S9 in this order or from step S2 to step S3, step S7, step S8, and step S9 in this order. The mode 4 control in which the electric water pump 5 is turned on, the engine side valve 71 is closed, and the heater side valve 72 is opened is executed in step S9.

Figure 10D:
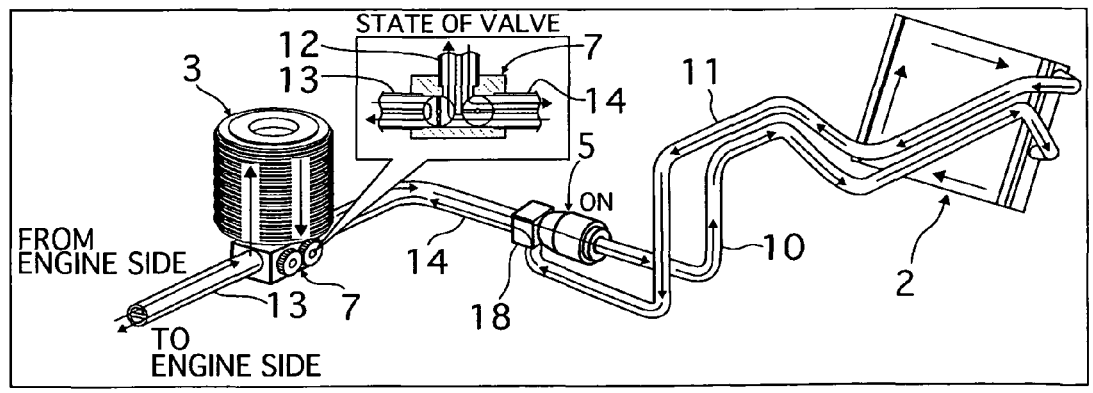
FIG. 10D is an illustrative view showing operations at the time of the quick interior warm-up immediately after the start of the engine in the heat storage system for a vehicle of Embodiment 1.

When the "quick interior warm-up mode" is selected by switching the control valve 7 (FIG. 7) set in the engine coolant circulation circuit immediately after the start of the engine, as shown in FIG. 10D, the hot water stored in the heat accumulator 3 circulates only through the heat accumulator 3 side inlet and outlet and the heater core 2 side inlet and outlet, so that interior heating immediately after the start of the engine can be performed.

After a set period of time in the mode 4 control has elapsed, the process proceeds from step S9 to step S5 and step S11 in this order. The flow of proceeding from step S5 to step S11 is repeated until it is judged that the engine is turned off in step S11, and the mode 1 control in which the electric water pump 5 is turned off, the engine side valve 71 is opened, and the heater side valve 72 is opened is executed in step S5.

That is, when the heating request is made by turning on the air-conditioner switch 20 and at least the engine coolant temperature is high at the start of the engine 1, it is speculated that the quick engine warm-up request has not been made while the quick interior warm-up request has been made. In this case, since the process proceeds from step S7 or step S8 to step S9, the quick interior warm-up request can be met by executing the mode 4 control.

Since the water amount in the circuit on the engine 1 side decreases (circulation amount on the heater core 2 side decreases) and a decrease in water temperature on the heater core 2 side due to heat radiation can be suppressed to be low at the time of the quick interior warm-up immediately after the start of the engine, a temperature increase of the engine coolant on the engine 1 side is enhanced. Thus, a quick warm-up effect of the engine 1 can also be obtained.

[Mode Shift Operation Immediately After Start of Engine]

In the flowchart of FIG. 8, when the air-conditioner switch 20 is turned on and both the external temperature and the engine coolant temperature are low or the external temperature is high while the engine coolant temperature is low at the start of the engine 1 after the engine 1 has been stopped, the process proceeds from step S2 to step S3, step S7, step S8, and step S10 in this order. In step S10, the mode 3 control in which the electric water pump 5 is turned off, the engine side valve 71 is opened, and the heater side valve 72 is closed is executed, and then the mode 4 control in which the electric water pump 5 is turned on, the engine side valve 71 is closed, and the heater side valve 72 is opened is executed.

When the "quick engine warm-up mode" is selected by switching the control valve 7 (FIG. 6) set in the engine coolant circulation circuit immediately after the start of the engine, as shown in FIG. 10C, the hot water (high-temperature engine coolant) stored in the heat accumulator 3 circulates only through the heat accumulator 3 side inlet and outlet and the engine 1 side inlet and outlet, so that the early engine warm-up after the start of the engine can be performed.

Then, when the "quick interior warm-up mode" is selected by switching the control valve 7 (FIG. 7) set in the engine coolant circulation circuit, as shown in FIG. 10D, the hot water stored in the heat accumulator 3 circulates only through the heat accumulator 3 side inlet and outlet and the heater core 2 side inlet and outlet, so that the interior heating immediately after the start of the engine can be performed.

After a set period of time of the mode shift control has elapsed, the process proceeds from step S10 to step S5 and step S11 in this order. The flow of proceeding from step S5 to step S11 is repeated until it is judged that the engine is turned off in step S11, and the mode 1 control in which the electric water pump 5 is turned off, the engine side valve 71 is opened, and the heater side valve 72 is opened is executed in step S5.

That is, when the heating request is made by turning on the air-conditioner switch 20 and the engine coolant temperature is low at the start of the engine 1, it is speculated that both the quick engine warm-up request and the quick interior warm-up request have been made. In this case, since the process proceeds from step S8 to step S10, both requests of the quick engine warm-up request and the quick interior warm-up request, can be met at the same time by executing the mode shift control of shifting from the mode 3 control to the mode 4 control.

Next, effects will be described.

With the heat storage system for a vehicle of Embodiment 1, the following effects can be obtained.

(1) In the heat storage system for a vehicle including the heat accumulator 3, in which engine coolant is stored and allowed to flow, in the engine coolant circulation circuit connecting the engine 1 and the heater core 2 of the air conditioning unit, the engine coolant circulation circuit is a circuit connecting the heat accumulator 3 side inlet and outlet, the engine 1 side inlet and outlet, and the heater core 2 side inlet and outlet, and has a circuit configuration in which four modes are selectable by switching the valve set in the circuit, the four modes including: the "heat storage mode" in which the engine coolant circulates at least through the engine 1 side inlet and outlet and the heat accumulator 3 side inlet and outlet; the "heat storage maintaining mode" in which the heat accumulator 3 side inlet and outlet are disconnected; the "quick engine warm-up mode" in which the hot water stored in the heat accumulator 3 circulates only through the heat accumulator 3 side inlet and outlet and the engine 1 side inlet and outlet; and the "quick interior warm-up mode" in which the hot water stored in the heat accumulator 3 circulates only through the heat accumulator 3 side inlet and outlet and the heater core 2 side inlet and outlet. Therefore, by the individual settings of the "quick engine warm-up mode" and the "quick interior warm-up mode," the quick engine warm-up performance and the quick interior warm-up performance immediately after the start of the engine can be improved.

(2) The engine coolant circulation circuit connects the heat-accumulator side two-way pipe 12, the engine-side two-way pipe 13, and the heater-core side two-way pipe 14 to the heat accumulator 3 side inlet and outlet, the engine 1 side inlet and outlet, and the heater core 2 side inlet and outlet, respectively, the pipes integrally including respective outward paths from outlets and return paths to inlets. The engine-side two-way pipe 13 and the heater-core side two-way pipe 14 are arranged on the same pipe axis, the heat-accumulator side two-way pipe 12 is arranged so as to interest perpendicularly with the pipe axis, and the two-way pipes 12, 13, and 14 are connected with one another at a portion where the heat-accumulator side two-way pipe 12 intersects. Therefore, the respective inlet and outlet of the heat accumulator 3 side inlet and outlet, the engine 1 side inlet and outlet, and the heater core 2 side inlet and outlet can be formed by one part which enables reduction in space and cost.

(3) The heat-accumulator side two-way pipe 12 disconnects the engine 1 side outlet and the heater core 2 side inlet, as well as connects the engine 1 side inlet and the heater core 2 side outlet by extending the partition wall 12a. In the connecting portion of the engine 1 side inlet and outlet and the heat accumulator 3 side inlet, the engine side valve 71 is arranged which switches between the opened position for connecting the engine 1 side outlet and the heat accumulator 3 side inlet and the closed position for disconnecting the engine 1 side inlet and outlet and the heat accumulator 3 side inlet. In the connecting portion of the heater core 2 side inlet and outlet and the heat accumulator 3 side outlet, the heater side valve 72 is arranged which switches between the opened position for connecting the heater core 2 side inlet and the heat accumulator 3 side outlet and the closed position for disconnecting the heater core 2 side inlet and outlet and the heat accumulator 3 side outlet. Therefore, a change control of the four modes can be achieved by a combination of the opened/closed positions of the engine side valve 71 and the heater side valve 72 provided in the position where the two-way pipes 12, 13, and 14 concentrate.

(4) The engine side valve 71 and the heater side valve 72 are the valve components of the control valve 7 in which the first connector 73 connecting the heat-accumulator-side two-way pipe 12, the engine-side two-way pipe 13, and the heater-core-side two-way pipe 14 serves as the common valve body for the collective setting. Therefore, by combinations of the two-way pipes 12, 13, and 14 and the control valve 7, the parts and control can be simplified to enable reduction in space and cost.

(5) The mode selection control device (FIG. 8) is provided which performs selection control of: the "heat storage mode" in which the engine side valve 71 and the heater side valve 72 are both set in the opened positions during driving with the heater in use so that the engine coolant may circulate through the engine 1 side inlet and outlet, the heat accumulator 3 side inlet and outlet, and the heater core 2 inlet and outlet; the "heat storage maintaining mode" in which the engine side valve 71 and the heater side valve 72 are both set in the closed positions when the engine is stopped so that the heat accumulator 3 side inlet and outlet may be disconnected; the "quick engine warm-up mode" in which the engine side valve 71 is set in the opened position and the heater side valve 72 is set in the closed position immediately after the start of the engine so that the hot water stored in the heat accumulator 3 may circulate only through the heat accumulator 3 side inlet and outlet and the engine 1 side inlet and outlet; and the "quick interior warm-up mode" in which the engine side valve 71 is set in the closed position and the heater side valve 72 is set in the opened position immediately after the start of the engine so that the hot water stored in the heat accumulator 3 may circulate only through the heat accumulator 3 side inlet and outlet and the heater core 2 side inlet and outlet via the electric water pump 5. Therefore, the selection control of the four modes of the "heat storage mode," the "heat storage maintaining mode," the "quick engine warm-up mode," and the "quick interior warm-up mode" depending on a vehicle state can be achieved by simple opening/closing controls of the engine side valve 71 and the heater side valve 72 and operation/stop control of the electric water pump 5.

Embodiment 2

Embodiment 2 is an example of a heat storage system for a vehicle which performs the same control as that in Embodiment 1 by using four valves.

First, a system configuration will be described.

Figure 11:
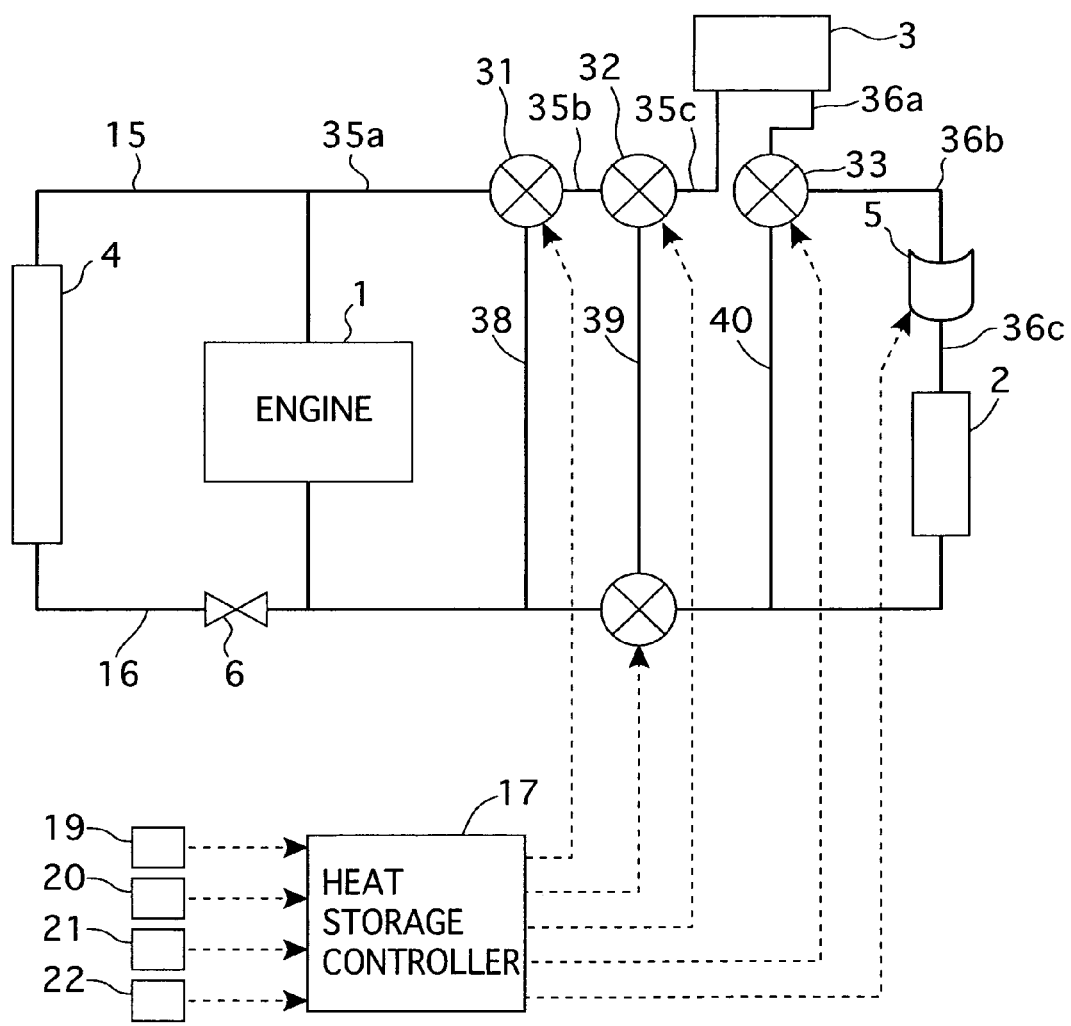
FIG. 11 is a view of an engine coolant circulation circuit which illustrates a heat storage system for a vehicle (one example of the heat storage system for a vehicle) of Embodiment 2.

FIG. 11 is a view of an engine coolant circulation circuit which illustrates the heat storage system for a vehicle (one example of the heat storage system for a vehicle) of Embodiment 2.

The heat storage system for a vehicle of Embodiment 2 includes, as shown in FIG. 11, the engine 1, the heater core 2, the heat accumulator 3, the radiator 4, the electric water pump 5, the thermostat 6, a first valve 31, a second valve 32, a third valve 33, a fourth valve 34, engine outlet pipes 35a, 35b, and 35c, heat-accumulator outlet pipes 36a, 36b, and 36c, heater-core outlet pipes 37a, 37b, 37c and 37d, a first bypass pipe 38, a second bypass pipe 39, a third bypass pipe 40, the radiator-side engine outlet pipe 15, the radiator-side engine inlet pipe 16, and the heat storage controller 17.

As shown in FIG. 11, the engine coolant circulation circuit includes the engine outlet pipes 35a, 35b, and 35c connecting an engine 1 outlet and a heat accumulator 3 inlet, the heat-accumulator outlet pipes 36a, 36b, and 36c connecting a heat accumulator 3 outlet and a heater core 2 inlet, and the heater-core outlet pipes 37a, 37b, 37c and 37d connecting a heater core 2 outlet and an engine 1 inlet.

The engine coolant circulation circuit further includes the first bypass pipe 38 and the second bypass pipe 39 connecting the engine outlet pipes 35a, 35b, and 35c and the heater-core outlet pipes 37b, 37c, and 37d, and the third bypass pipe 40 connecting the heat-accumulator outlet pipes 36a and 36b and the heater-core outlet pipes 37a and 37b.

The first valve 31 is set in a position where the engine outlet pipes 35a and 35b and the first bypass pipe 38 intersect. The second valve 32 is set in a position where the engine outlet pipes 35b and 35c and the second bypass pipe 39 intersect. The third valve 33 is set in a position where the heat-accumulator outlet pipes 36a and 36b and the third bypass pipe 40 intersect. The fourth valve 34 is set in a position where the heater-core outlet pipes 37b and 37c and the second bypass pipe 39 intersect. Note that other configurations are similar to those of Embodiment 1, and therefore corresponding configurations are denoted by the same reference numerals and descriptions thereof will be omitted.

Next, operations will be described.

The heat storage system for a vehicle of Embodiment 2 implements the four modes of a "heat storage mode," a "heat storage maintaining mode," a "quick engine warm-up mode," and a "quick interior warm-up mode" in the following manner.

Figure 12A:
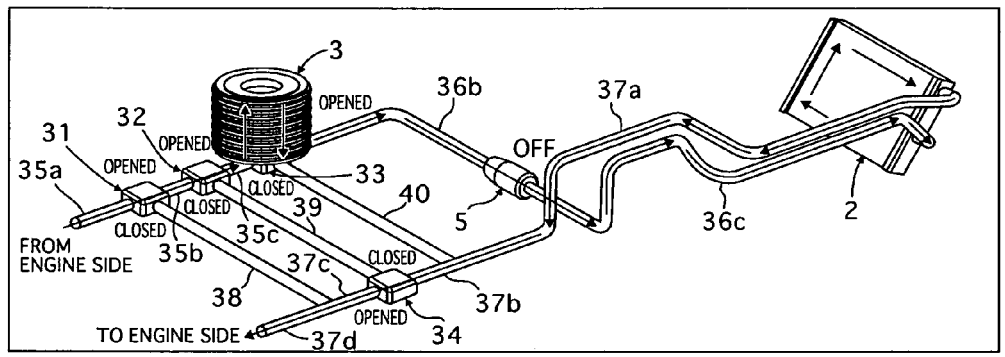
FIG. 12A is an illustrative view showing operations during driving with a heater in use in the heat storage system for a vehicle of Embodiment 2.

When the "heat storage mode" is selected, the first valve 31, the second valve 32, the third valve 33, and the fourth valve 34 are set in opened positions on main pipe sides and are set in closed positions on bypass pipe sides during driving with a heater in use. Accordingly, as shown in FIG. 12A, the engine coolant circulates through the engine side inlet and outlet, the heat-accumulator side inlet and outlet, and the heater core inlet and outlet.

Figure 12B:
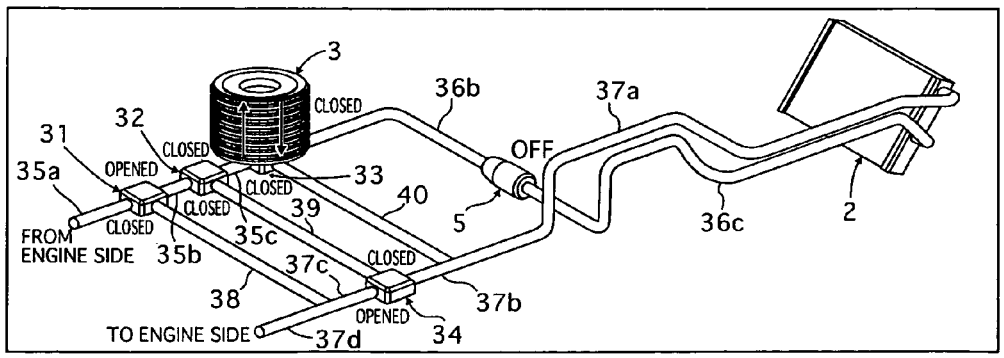
FIG. 12B is an illustrative view showing operations when an engine is stopped in the heat storage system for a vehicle of Embodiment 2.

When the "heat storage maintaining mode" is selected, the second valve 32 and the third valve 33 are set in the closed positions on the main pipe sides when the engine is stopped. Accordingly, as shown in FIG. 12B, the heat accumulator 3 side inlet and outlet are disconnected.

Figure 12C:
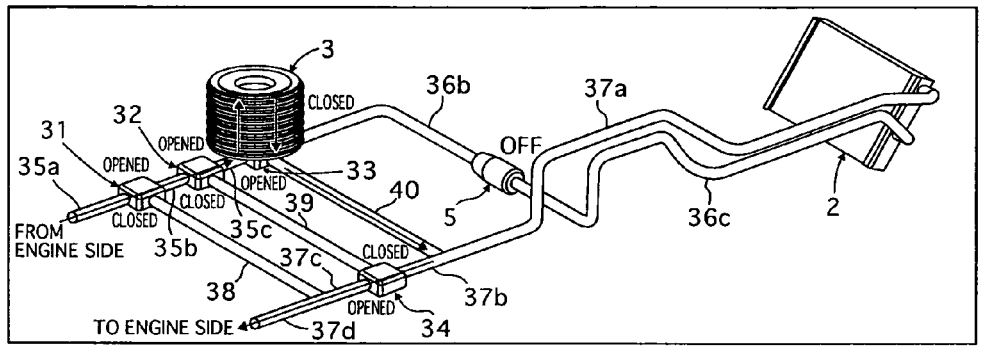
FIG. 12C is an illustrative view showing operations at the time of a quick engine warm-up immediately after the start of the engine in the heat storage system for a vehicle of Embodiment 2.

When the "quick engine warm-up mode" is selected, the first valve 31, the second valve 32, and the fourth valve 34 are set in the opened positions on the main pipe sides and the third valve 33 is set in the opened position on the bypass pipe side immediately after the start of the engine. Accordingly, as shown in FIG. 12C, the hot water stored in the heat accumulator 3 circulates only through the heat accumulator 3 side inlet and outlet and the engine 1 side inlet and outlet.

Figure 12D:
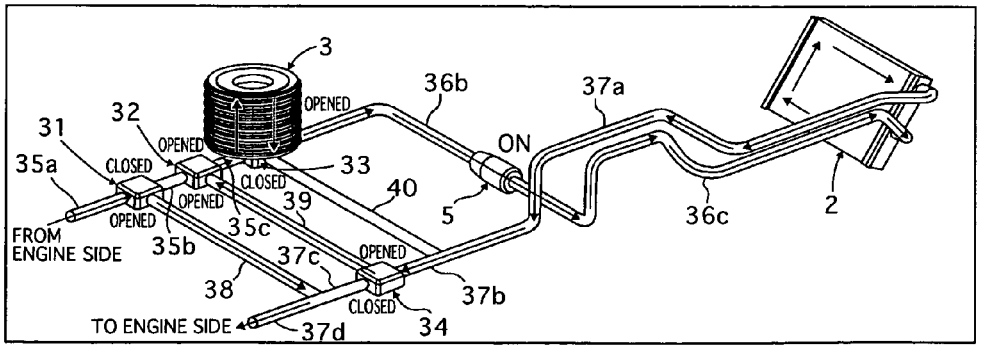
FIG. 12D is an illustrative view showing operations at the time of a quick interior warm-up immediately after the start of the engine in the heat storage system for a vehicle of Embodiment 2.

When the "quick interior warm-up mode" is selected, the first valve 31 is set in the opened position on the bypass pipe side, the second valve 32 and the fourth valve 34 are set in the closed positions on the bypass pipe sides, and the third valve 33 is set in the opened position on the main pipe side immediately after the start of the engine. Accordingly, as shown in FIG. 12D, the hot water stored in the heat accumulator 3 circulates only through the heat accumulator 3 side inlet and outlet and the heater core 2 side inlet and outlet via the electric water pump 5. Note that other operations are similar to those of Embodiment 1, and therefore descriptions thereof will be omitted.

Next, effects will be described.

With the heat storage system for a vehicle of Embodiment 2, the following effects can be obtained in addition to the effect of (1) of Embodiment 1.

(6) The engine coolant circulation circuit includes the engine outlet pipes 35a, 35b, and 35c connecting the engine 1 outlet and the heat accumulator 3 inlet, the heat-accumulator outlet pipes 36a, 36b, and 36c connecting the heat accumulator 3 outlet and the heater core 2 inlet, the heater-core outlet pipes 37a, 37b, 37c, and 37d connecting the heater core 2 outlet and the engine 1 inlet, the first bypass pipe 38 and the second bypass pipe 39 connecting the engine outlet pipes 35a, 35b, and 35c and the heater-core outlet pipes 37b, 37c, and 37d, and the third bypass pipe 40 connecting the heat-accumulator outlet pipes 36a and 36b and the heater-core outlet pipes 37a and 37b. The first valve 31 is set in the position where the engine outlet pipes 35a and 35b and the first bypass pipe 38 intersect, the second valve 32 is set in the position where the engine outlet pipe 35b and 35c and the second bypass pipe 39 intersect, the third valve 33 is set in the position where the heat-accumulator outlet pipes 36a and 36b and the third bypass pipe 40 intersect, and the fourth valve 34 is set in the position where the heater-core outlet pipes 37b and 37c and the second bypass pipe 39 intersect. Therefore, a change control of the four modes can be achieved by combinations of the opened/closed positions of the first valve 31, the second valve 32, the third valve, and the fourth valve 34.

(7) Mode selection control device is provided which performs selection control of: the "heat storage mode" in which the first valve 31, the second valve 32, the third valve 33, and the fourth valve 34 are set in the opened positions on the main pipe sides and are set in the closed positions on the bypass pipe sides during driving with the heater in use so that the engine coolant may circulate through the engine side inlet and outlet, the heat-accumulator side inlet and outlet, and the heater core inlet and outlet; the "heat storage maintaining mode" in which the second valve 32 and the third valve 33 are set in the closed positions on the main pipe sides when the engine is stopped so that the heat accumulator 3 side inlet and outlet may be disconnected; the "quick engine warm-up mode" in which the first valve 31, the second valve 32, and the fourth valve 34 are set in the opened positions on the main pipe sides and the third valve 33 is set in the opened position on the bypass pipe side immediately after the start of the engine so that the hot water stored in the heat accumulator 3 may circulate only through the heat accumulator 3 side inlet and outlet and the engine 1 side inlet and outlet; and the "quick interior warm-up mode" in which the first valve 31 is set in the opened position on the bypass pipe side, the second valve 32 and the fourth valve 34 are set in the closed positions on the bypass pipe sides, and the third valve 33 is set in the opened position on the main pipe side immediately after the start of the engine so that the hot water stored in the heat accumulator 3 may circulate only through the heat accumulator 3 side inlet and outlet and the heater core 2 side inlet and outlet via the electric water pump 5. Therefore, the selection control of the four modes of the "heat storage mode," the "heat storage maintaining mode," the "quick engine warm-up mode," and the "quick interior warm-up mode" depending on a vehicle state can be achieved by simple opening/closing controls of the first valve 31 to the fourth valve 34 and operation/stop control of the electric water pump 5.

The heat storage system for a vehicle of the present invention has been described above based on Embodiment 1 and Embodiment 2. However, specific configurations are not limited to these examples, and a change, addition, or the like in design is permitted without departing from the gist of the invention according to the appended claims.

The example of the circuit configuration using three two-way pipes and one control valve has been shown in Embodiment 1, and the example of the circuit configuration using normal pipes and four valves has been shown in Embodiment 2. However, specific circuit configurations are not limited to those of Examples 1 and 2. That is, the present invention includes other circuit configurations in which the four modes of the "heat storage mode," the "heat storage maintaining mode," the "quick engine warm-up mode," and the "quick interior warm-up mode" are selectable.

The present invention claims priority based on Japanese Patent Application No. 2006-319481 filed on Nov. 28, 2006, and the content of the same application including the specification, drawings, and scope of claims is incorporated herein by reference in its entirety.

INDUSTRIAL APPLICABILITY

The examples in which the heat storage system for a vehicle is applied to an engine car have been shown in Examples 1 and 2. However, the heat storage system for a vehicle of the present invention may also be applied to a hybrid vehicle. That is, it may be applied to a vehicle including a heat accumulator in an engine coolant circulation circuit connecting an engine and a heater core.

The invention claimed is:

1. A heat storage system for a vehicle comprising a heat accumulator, in which engine coolant is stored and allowed to flow, in an engine coolant circulation circuit connecting an engine and a heater core of an air conditioning unit, the system characterized in that
the engine coolant circulation circuit is a circuit connecting heat-accumulator side inlet and outlet, engine side inlet and outlet, and heater-core side inlet and outlet, and has a circuit configuration in which four modes are selectable by switching a valve set in the circuit, the four modes including: a heat storage mode in which the engine coolant circulates at least through the engine side inlet and outlet and the heat-accumulator side inlet and outlet; a heat storage maintaining mode in which the heat-accumulator side inlet and outlet are disconnected; a quick engine warm-up mode in which hot water stored in the heat accumulator circulates only through the heat-accumulator side inlet and outlet and the engine side inlet and outlet; and a quick interior warm-up mode in which the hot water stored in the heat accumulator circulates only through the heat-accumulator side inlet and outlet and the heater-core side inlet and outlet.

2. The heat storage system for a vehicle according to claim 1, characterized in that
the engine coolant circulation circuit connects a heat-accumulator side two-way pipe, an engine-side two-way pipe, and a heater-core side two-way pipe to the heat-accumulator side inlet and outlet, the engine side inlet and outlet, and the heater-core side inlet and outlet, respectively, the pipes integrally including respective outward paths from outlets and return paths to inlets, and
the engine-side two-way pipe and the heater-core side two-way pipe are arranged on the same pipe axis, the heat-accumulator side two-way pipe is arranged so as to interest perpendicularly with the pipe axis, and the two-way pipes are connected with one another at a portion where the heat-accumulator side two-way pipe intersects.

3. The heat storage system for a vehicle according to claim 2, characterized in that
the heat-accumulator side two-way pipe disconnects the engine side outlet and the heater-core side inlet, as well as connects the engine side inlet and the heater-core side outlet by extending its partition wall,
in a connecting portion of the engine side inlet and outlet and the heat-accumulator side inlet, an engine side valve is arranged which switches between an opened position for connecting the engine side outlet and the heat-accumulator side inlet and a closed position for disconnecting the engine side inlet and outlet and the heat-accumulator side inlet, and
in a connecting portion of the heater-core side inlet and outlet and the heat-accumulator side outlet, a heater side valve is arranged which switches between an opened position for connecting the heater-core side inlet and the heat-accumulator side outlet and a closed position for disconnecting the heater-core side inlet and outlet and the heat-accumulator side outlet.

4. The heat storage system for a vehicle according to claim 3, characterized in that
the engine side valve and the heater side valve are valve components of a control valve in which a connector member connecting the heat-accumulator side two-way pipe, the engine-side two-way pipe, and the heater-core side two-way pipe serves as a common valve body for a collective setting.

5. The heat storage system for a vehicle according to claim 3, characterized by further comprising a mode selection control device which performs selection control of:
the heat storage mode in which the engine side valve and the heater side valve are both set in the opened positions during driving with a heater in use so that the engine coolant circulates through the engine side inlet and outlet, the heat-accumulator side inlet and outlet, and the heater core inlet and outlet;
the heat storage maintaining mode in which the engine side valve and the heater side valve are both set in the closed positions when the engine is stopped so that the heat-accumulator side inlet and outlet are disconnected;
the quick engine warm-up mode in which the engine side valve is set in the opened position and the heater side valve is set in the closed position immediately after the start of the engine so that the hot water stored in the heat accumulator circulates only through the heat-accumulator side inlet and outlet and the engine side inlet and outlet; and the quick interior warm-up mode in which the engine side valve is set in the closed position and the heater side valve is set in the opened position immediately after the start of the engine so that the hot water stored in the heat accumulator circulates only through the heat-accumulator side inlet and outlet and the heater-core side inlet and outlet via a water pump.

6. The heat storage system for a vehicle according to claim 4, characterized by further comprising a mode selection control device which performs selection control of:

the heat storage mode in which the engine side valve and the heater side valve are both set in the opened positions during driving with a heater in use so that the engine coolant circulates through the engine side inlet and outlet, the heat-accumulator side inlet and outlet, and the heater core inlet and outlet;

the heat storage maintaining mode in which the engine side valve and the heater side valve are both set in the closed positions when the engine is stopped so that the heat-accumulator side inlet and outlet are disconnected;

the quick engine warm-up mode in which the engine side valve is set in the opened position and the heater side valve is set in the closed position immediately after the start of the engine so that the hot water stored in the heat accumulator circulates only through the heat-accumulator side inlet and outlet and the engine side inlet and outlet; and the quick interior warm-up mode in which the engine side valve is set in the closed position and the heater side valve is set in the opened position immediately after the start of the engine so that the hot water stored in the heat accumulator circulates only through the heat-accumulator side inlet and outlet and the heater-core side inlet and outlet via a water pump.

7. The heat storage system for a vehicle according to claim 1, characterized in that the engine coolant circulation circuit includes an engine outlet pipe connecting an engine outlet and a heat accumulator inlet, a heat-accumulator outlet pipe connecting a heat accumulator outlet and a heater core inlet, a heater-core outlet pipe connecting a heater core outlet and an engine inlet, a first bypass pipe and a second bypass pipe connecting the engine outlet pipe and the heater-core outlet pipe, and a third bypass pipe connecting the heat-accumulator outlet pipe and the heater-core outlet pipe, a first valve is set in a position where the engine outlet pipe and the first bypass pipe Intersect, a second valve is set in a position where the engine outlet pipe and the second bypass pipe intersect, a third valve is set in a position where the heat-accumulator outlet pipe and the third bypass pipe intersect, and a fourth valve is set in a position where the heater-core outlet pipe and the second bypass pipe intersect.

8. The heat storage system for a vehicle according to claim 7, characterized by further comprising a mode selection control device which performs selection control of:

The heat storage mode in which the first valve, the second valve, the third valve, and the fourth valve are set in opened positions on main pipe sides and are set in closed positions on bypass pipe sides during driving with a heater in use so that the engine coolant circulates through the engine side inlet and outlet, the heat-accumulator side inlet and outlet, and the heater core inlet and outlet;

The heat storage maintaining mode in which the second valve and the third valve are set in closed positions on the main pipe sides when the engine is stopped so that the heat-accumulator side inlet and outlet are disconnected;

The quick engine warm-up mode in which the first valve, the second valve, and the fourth valve are set in the opened positions on the main pipe sides and the third valve is set in an opened position on the bypass pipe side immediately after the start of the engine so that the hot water stored in the heat accumulator circulates only through the heat-accumulator side inlet and outlet and the engine side inlet and outlet; and The quick interior warm-up mode in which the first valve is set in an opened position on the bypass pipe side, the second valve and the fourth valve are set in the opened positions on the bypass pipe sides, and the third valve is set in the opened position on the main pipe side immediately after the start of the engine so that the hot water stored in the heat accumulator circulates only through the heat-accumulator side inlet and outlet and the heater-core side inlet and outlet via a water pump.

* * * * *